(12) United States Patent
Nguyen et al.

(10) Patent No.: US 11,906,058 B2
(45) Date of Patent: Feb. 20, 2024

(54) ROTARY VALVE AND SYSTEM

(71) Applicants: Hai Hoang Nguyen, Rosenberg, TX (US); Michael Andrew Palmer, Jersey Village, TX (US)

(72) Inventors: Hai Hoang Nguyen, Rosenberg, TX (US); Michael Andrew Palmer, Jersey Village, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 53 days.

(21) Appl. No.: 17/677,308

(22) Filed: Feb. 22, 2022

(65) Prior Publication Data

US 2023/0265931 A1  Aug. 24, 2023

(51) Int. Cl.
  *E21B 34/06* (2006.01)
  *F16K 11/078* (2006.01)
  *F16K 27/04* (2006.01)

(52) U.S. Cl.
  CPC ............ *F16K 11/078* (2013.01); *E21B 34/06* (2013.01); *F16K 27/041* (2013.01)

(58) Field of Classification Search
  CPC .......... E21B 34/06; E21B 34/10; E21B 34/14; F16K 11/078; F16K 27/041
  See application file for complete search history.

(56) References Cited

U.S. PATENT DOCUMENTS

| | | | |
|---|---|---|---|
| 4,369,840 A | 1/1983 | Szarka et al. | |
| 5,117,685 A | 6/1992 | Goldschild | |
| 6,782,952 B2 | 8/2004 | Garay et al. | |
| 7,281,584 B2* | 10/2007 | McGarian | E21B 23/006 166/240 |
| 7,337,847 B2* | 3/2008 | McGarian | E21B 23/006 166/334.4 |
| 7,357,198 B2* | 4/2008 | Mcgarian | E21B 21/103 175/215 |

(Continued)

FOREIGN PATENT DOCUMENTS

| | | |
|---|---|---|
| WO | 2011102820 A1 | 8/2011 |
| WO | 2021197625 A1 | 10/2021 |

OTHER PUBLICATIONS

InFORCE Sliding Sleeves, Baker Hughes, https://www.bakerhughes.com/completions/well-monitoring-and-analytics/intelligent-completion-systems-and-flow-assurance/interval-control-valves/inforce-sliding-sleeves; 3 pages.

(Continued)

*Primary Examiner* — Matthew R Buck
(74) *Attorney, Agent, or Firm* — CANTOR COLBURN LLP (57) ABSTRACT

A rotary valve including a port housing, a port, an axially actuated rotary sleeve disposed within the port housing, the sleeve having a plurality of apertures in fluid communication with the port; and an insert disposed within the sleeve, the insert having an opening, the sleeve being rotatable to align one of the plurality of apertures with the opening. A rotary valve including a port housing, having a port, an axially actuated rotary sleeve disposed within the port housing, the sleeve having an aperture; and an insert disposed within the sleeve, the insert having a plurality of openings of distinct size from one another, the aperture of the sleeve being selectively alignable with one of the plurality of openings.

16 Claims, 6 Drawing Sheets

(56) References Cited

U.S. PATENT DOCUMENTS

| | | | |
|---|---|---|---|
| 7,510,013 B2 | 3/2009 | Kimpel | |
| 7,654,331 B2 * | 2/2010 | Wolters | |
| 9,328,579 B2 * | 5/2016 | Wilson | E21B 23/006 |
| 9,528,356 B2 * | 12/2016 | Russo | E21B 23/006 |
| 9,856,712 B2 | 1/2018 | Minnock et al. | |
| 10,597,974 B2 * | 3/2020 | Atkins | E21B 34/10 |
| 2014/0318806 A1 | 10/2014 | Machocki | |
| 2015/0041133 A1 | 2/2015 | Chauffe | |
| 2016/0333666 A1 | 11/2016 | Mcglothen | |
| 2019/0112900 A1 | 4/2019 | Osunjaye et al. | |

OTHER PUBLICATIONS

Notification of Transmittal of the International Search Report and the Written Opinion of the International Searching Authority, or the Declaration; PCT/US2023/062568; dated Jun. 9, 2023; 10 pages.

* cited by examiner

ROTARY VALVE AND SYSTEM

BACKGROUND

In the resource recovery and fluid sequestration industries, valves are necessary for many purposes. In each case, particular valves may be more appropriate than others for reasons such as throughput, length, weight, complexity, etc. Unfortunately, there are fewer types of valves available to the industry than meet all of the potential needs. Accordingly, the art well receives alternatives.

SUMMARY

An embodiment of a rotary valve including a port housing, having a port, an axially actuated rotary sleeve disposed within the port housing, the sleeve having a plurality of apertures of distinct size from one another and in fluid communication with the port; and an insert disposed within the sleeve, the insert having an opening, the sleeve being rotatable to align one of the plurality of apertures with the opening.

An embodiment of a borehole system including a borehole in a subsurface formation, a string disposed in the borehole, and a valve disposed within or as a part of the string.

An embodiment of a rotary valve including a port housing, having a port, an axially actuated rotary sleeve disposed within the port housing, the sleeve having an aperture; and an insert disposed within the sleeve, the insert having a plurality of openings of distinct size from one another, the aperture of the sleeve being selectively alignable with one of the plurality of openings.

An embodiment of a borehole system including a borehole in a subsurface formation, a string disposed in the borehole, and a valve disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
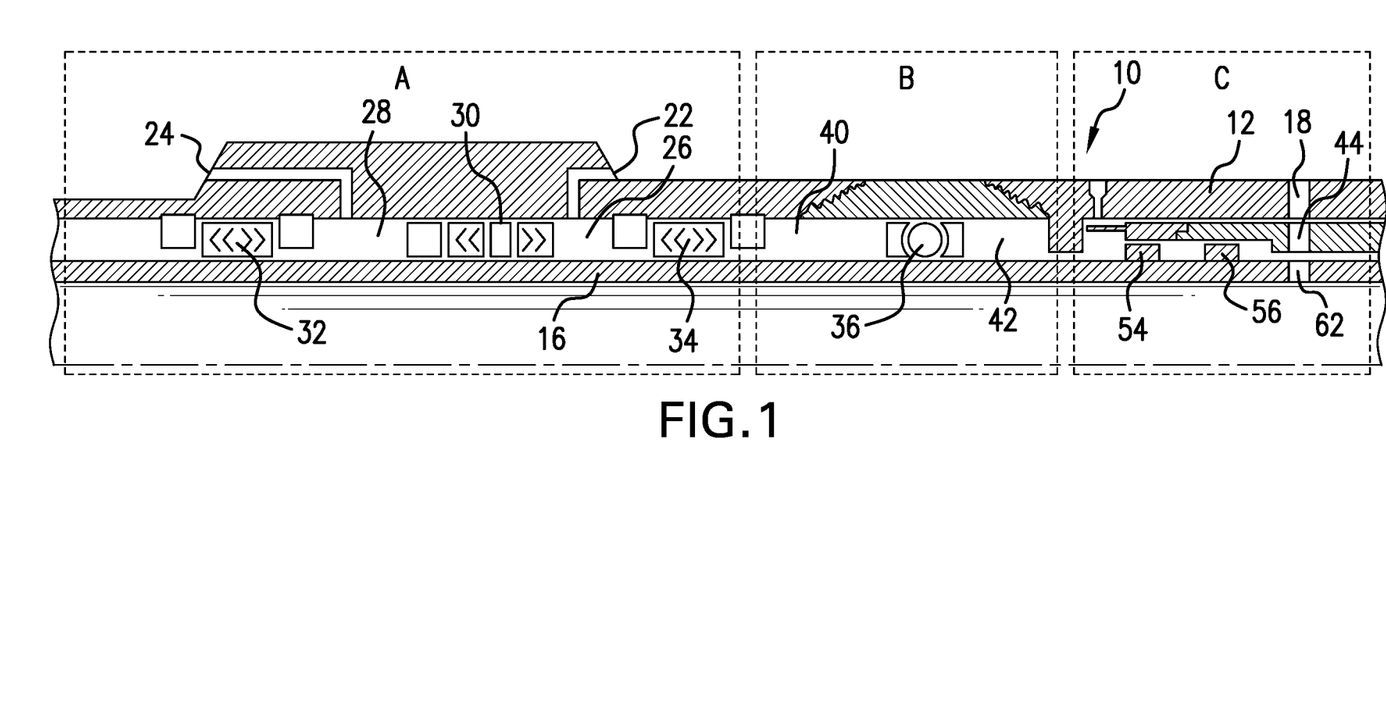
FIG. 1 is a cross sectional view of a rotary valve as disclosed herein.

Referring to FIG. 1, a rotary valve 10 is illustrated. Valve 10 comprises a ported housing 12, an axially actuated rotary sleeve 14 and an insert 16. The ported housing 12 includes a port 18 that, in an embodiment, includes a manifold j=20 (see FIGS. 2 and 3). There may be more than one port 18 in housing 12 but in embodiments where the manifold groove 20 is included, all potential ports 18 are fluidly connected to one another through the manifold groove 20. Also, in an embodiment, the port housing 12 includes a control line inlet 22 that allows the connection to a control line (not shown) so that hydraulic fluid may be used to shift the insert 16 axially during use of the valve 10. There may also be a second control line inlet 24 where a second control line may be used to pressure up and move the insert 16 axially in an opposite direction. Either of the control line inlets 22 and 24 may be used in embodiments without the other of the two if a resetting configuration such as a spring is employed to move the insert back to a first position after one of the control lines moves it to a second position. As shown, both control line inlets are used with each of the control line inlets 22 and 24 leading to volume changeable chambers 26 and 28, respectively, with a seal 30 therebetween. The seal 30 allows the insert 16 to behave as a piston with pressure in chamber 26 from inlet 22 causing the insert 16 to move leftwardly in FIG. 1 and pressure in chamber 28 from inlet 24 causing the insert 16 to move rightwardly in FIG. 1. Seals 32 and 34 occur on either side of the seal 30 and help define the chambers 28 and 26, respectively.

Also disposed between the port housing 12 and the insert 16 is a balance piston 36 that is disposed between two more volumes 40 and 42 of the valve. Volume 40 is open to annulus fluid, during use and pressure compensated volume 42, which is filled with a clean hydraulic fluid sealed at seal 38 and seal 48 to ensure that the axially actuated rotary sleeve 14 will function as designed without difficulties introduced by detritus accumulating therein.

Figure 2:
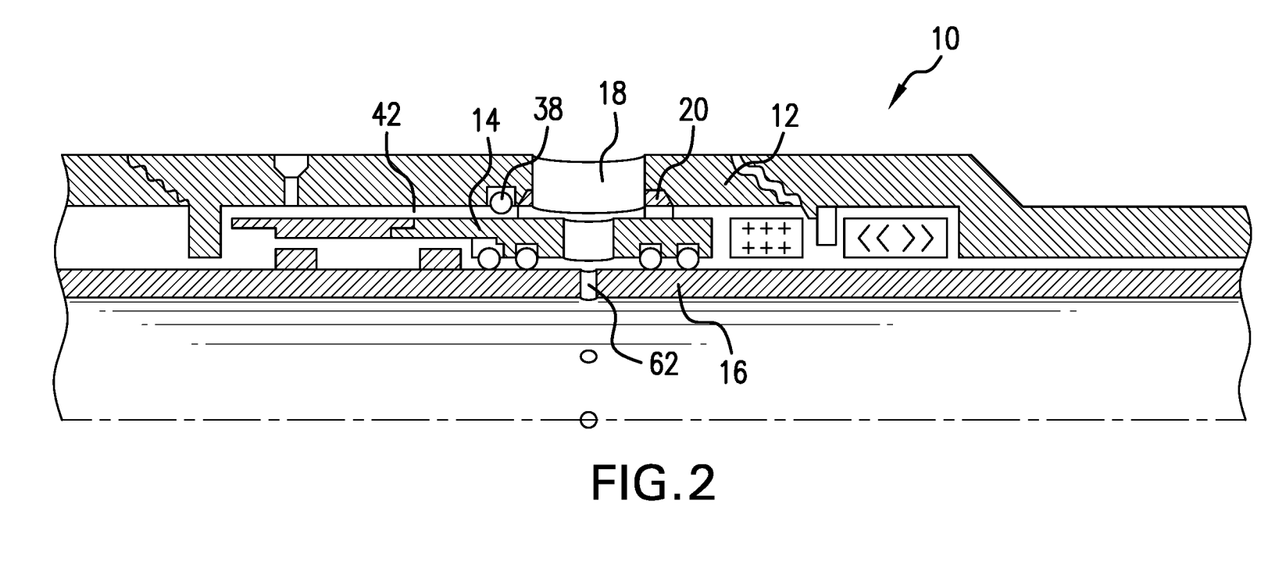
FIG. 2 is an enlarged portion of FIG. 1.
Figure 3:
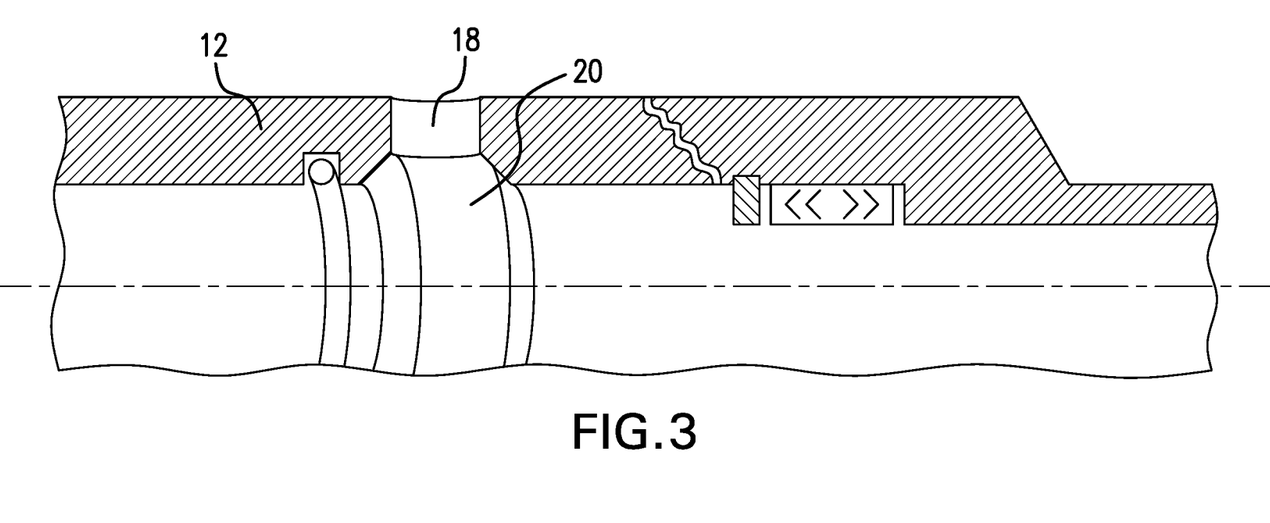
FIG. 3 is a view of a portion of the port housing of the rotary valve as disclosed herein.
Figure 4:
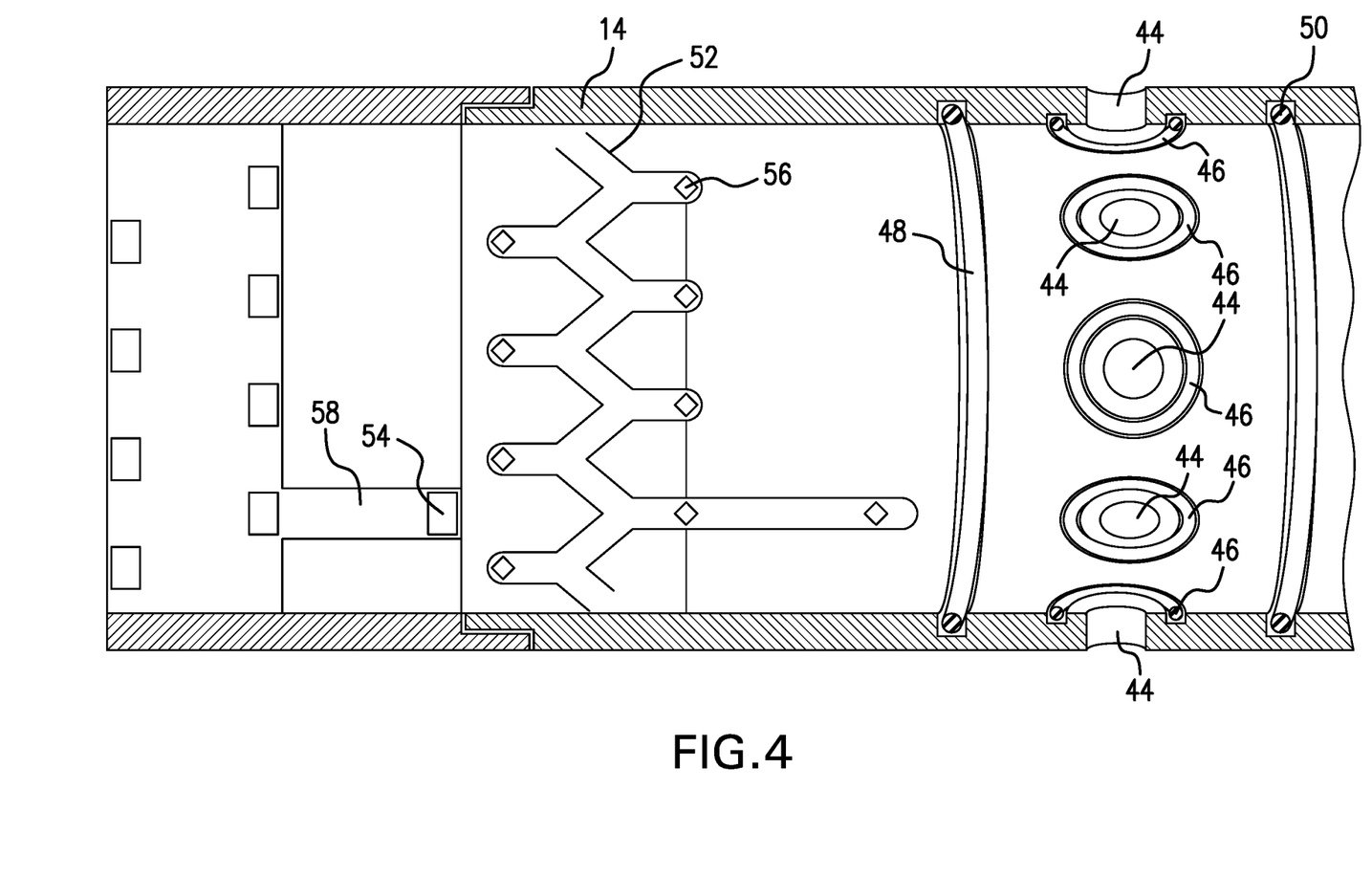
FIG. 4 is a cross sectional view of the axially actuated rotary sleeve of the valve as disclosed herein.

Referring to FIGS. 2 and 4, the sleeve 14 may be better appreciated. Sleeve 14 includes a plurality of apertures 44 disposed about its circumference. The number of apertures possible is directly related to the real estate available to disposed them in the sleeve and also be able to disposed a seal 46 around each aperture that will seal against insert 16. In various embodiments, 2, 4, 8, 10, etc. apertures may be employed. Regardless of number of apertures, there are at least two different sizes of aperture among the plurality of apertures. Accordingly, when rotating the sleeve 14, it is possible to align one size aperture 44, in embodiments without grove 20 with the port 18 or another size aperture 44 with the port 18 or if the embodiment includes the groove 20, alignment with port 18 is unnecessary as all apertures 44 are fluidly connected to the port 18 through groove 20. This provides control of flow characteristics through the valve. In embodiments, each of the apertures provided in sleeve 14 are of different dimensions than all other apertures in the sleeve 14. Accordingly, an aperture size from multiple different sizes can be selected for desired flow characteristics. Additional seals 48 and 50 may also be included and disposed between the sleeve 14 and insert 16 annularly, in some embodiments.

The sleeve 14 is rotated through axial manipulation of the insert 16. This is by way of a J-slot configuration 52 in one embodiment, which is best seen in FIG. 4 but reference must also be made to FIGS. 1 and 2 to appreciate a bearing lug 54 and a J-pin 56 protruding radially outwardly from the insert 16. The lug and J-pin both interact with the sleeve 14. Cycling the insert 16 using the control line inlets 22 and or 24 will cause the insert 16 to move axially of the sleeve 14 and the sleeve 14 to rotate in accordance with the pathway of the J-slot 52 interacting with the J-pin 56. How a pin interacts with a J-slot is known. The lug 54 functions to limit travel of the insert 16 and only allows additional travel when the operator intends to fully close the valve 10. This is only possible when the lug 54 is aligned with lug slot 58 and the pin 56 is aligned with a full close extension 60 of the J-slot 52. Since the J-slot 52 is in a known orientation relative to the plurality of apertures 44, the operator can select alignment of whatever one of the apertures 44 is appropriate and cycle the insert the correct number of times to align that aperture 44 with both the port 18 and an opening 62 in the insert that allows ID (inside diameter) fluid from the valve and indeed the tubing string with which the valve will be connected so that fluid may flow between the ID and the annulus through the aligned opening/aperture/port of the valve 10.

Figure 5:
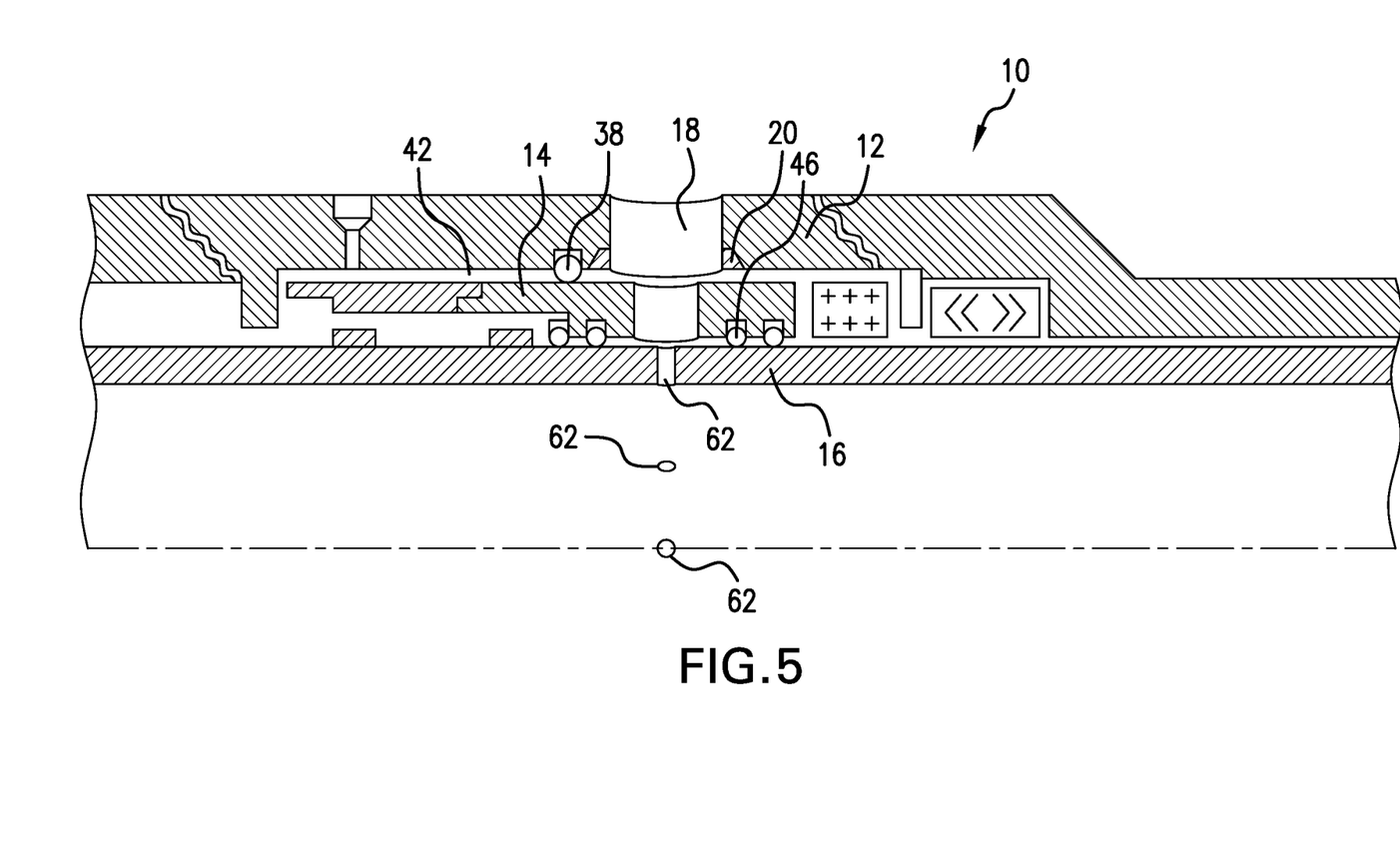
FIG. 5 is a view similar to that of FIG. 2 with a plurality of different insert opening sizes.

In another embodiment, referring to FIG. 5, the insert 16 is configured with a plurality of openings 62, at least one of which is of distinct size. In FIG. 5, three different sizes of aperture 62 are depicted. The sleeve 14 must then only have a single aperture 44 and a single aperture seal 46 that may be rotated about the insert 16 based upon the J-slot movement as discussed above. The movement facilitates selection among the various size openings 62 to be aligned with the aperture 44. It will be appreciated that the aperture 44 in this embodiment would be sized to be at least as large as the larges opening 62 so that it would be the opening 62 selected that provides the flow control desired. This embodiment would work with groove 20 and no significant alignment with port 18 is needed.

Advantageously, the overall length of valve 10 is significantly shorter than prior art axial sliding sleeves that might be used for fluid communication between the ID and annulus of a string. Shorter tools are beneficial for a host of reasons known to those of ordinary skill in the art.

Figure 6:
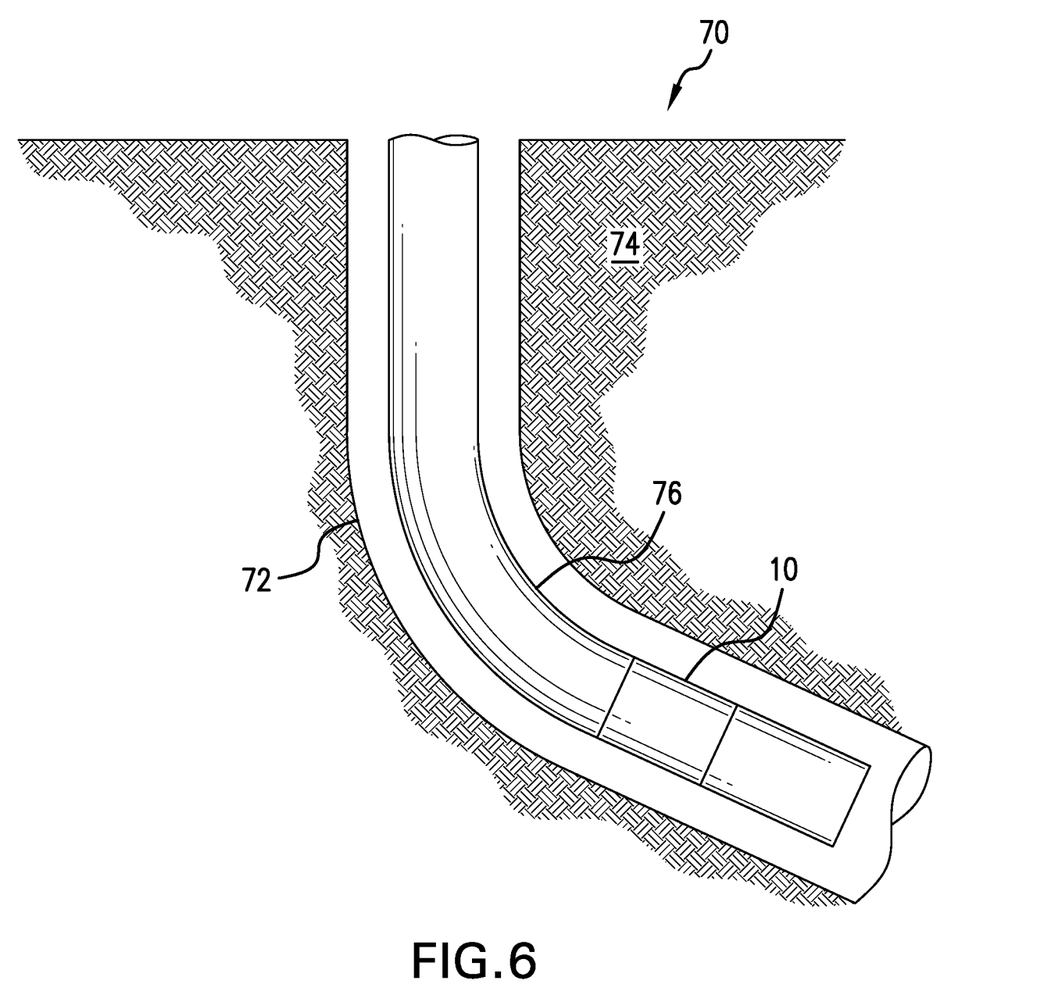
FIG. 6 is a view of a borehole system including the rotary valve disclosed herein.

Referring to FIG. 6, a borehole system 70 is illustrated. System 70 includes a borehole 72 in a subsurface formation 74. A string 76 is disposed in the borehole 72. A valve 10 is disposed within or as a part of the string 76.

Set forth below are some embodiments of the foregoing disclosure:

Embodiment 1: A rotary valve including a port housing, having a port, an axially actuated rotary sleeve disposed within the port housing, the sleeve having a plurality of apertures of distinct size from one another and in fluid communication with the port; and an insert disposed within the sleeve, the insert having an opening, the sleeve being rotatable to align one of the plurality of apertures with the opening.

Embodiment 2: The valve as in any prior embodiment wherein the port housing includes a manifold groove.

Embodiment 3: The valve as in any prior embodiment wherein the sleeve includes a J-slot.

Embodiment 4: The valve as in any prior embodiment wherein the plurality of apertures are 4 apertures.

Embodiment 5: The valve as in any prior embodiment wherein the insert is configured to move reciprocally axially of the housing.

Embodiment 6: The valve as in any prior embodiment wherein the insert is movable based upon hydraulic fluid pressure.

Embodiment 7: The valve as in any prior embodiment wherein the fluid pressure is dedicated pressure from a control line.

Embodiment 8: The valve as in any prior embodiment wherein the sleeve moves within a pressure compensated clean fluid environment.

Embodiment 9: The valve as in any prior embodiment wherein a balance piston is disposed between the insert and the port housing, the balance piston being exposed to annulus pressure on one side and clean fluid on a second side, during use.

Embodiment 10: The valve as in any prior embodiment wherein the valve includes an annular seal disposed between the sleeve and the insert and an aperture seal disposed around at least one of the plurality of apertures.

Embodiment 11: A borehole system including a borehole in a subsurface formation, a string disposed in the borehole, and a valve as in any prior embodiment disposed within or as a part of the string.

Embodiment 12: A rotary valve including a port housing, having a port, an axially actuated rotary sleeve disposed within the port housing, the sleeve having an aperture; and an insert disposed within the sleeve, the insert having a plurality of openings of distinct size from one another, the aperture of the sleeve being selectively alignable with one of the plurality of openings.

Embodiment 13: The valve as in any prior embodiment wherein the port housing includes a manifold groove.

Embodiment 14: The valve as in any prior embodiment wherein the sleeve includes a J-slot.

Embodiment 15: The valve as in any prior embodiment wherein the plurality of openings are 3 openings.

Embodiment 16: The valve as in any prior embodiment wherein the insert is configured to move reciprocally axially of the housing.

Embodiment 17: The valve as in any prior embodiment wherein the valve includes an annular seal disposed between the sleeve and the insert and an aperture seal disposed around the aperture.

Embodiment 18: The valve as in any prior embodiment wherein the sleeve moves within a pressure compensated clean fluid environment.

Embodiment 19: The valve as in any prior embodiment wherein a balance piston is disposed between the insert and the port housing, the balance piston being exposed to annulus pressure on one side and clean fluid on a second side, during use.

Embodiment 20: A borehole system including a borehole in a subsurface formation, a string disposed in the borehole, and a valve as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A rotary valve comprising:
a port housing, having a port;
an axially actuated rotary sleeve disposed within the port housing, the sleeve having a plurality of apertures of distinct size from one another and in fluid communication with the port, wherein the sleeve is movable within a pressure compensated clean fluid;
an insert disposed within the sleeve, the insert having an opening, the sleeve being rotatable to align one of the plurality of apertures with the opening; and
wherein a balance piston is disposed between the insert and the port housing, the balance piston being exposed to annulus pressure on one side the clean fluid on a second side, during use.

2. The valve as claimed in claim 1 wherein the port housing includes a manifold groove.

3. The valve as claimed in claim 1 wherein the sleeve includes a J-slot.

4. The valve as claimed in claim 1 wherein the plurality of apertures are 4 apertures.

5. The valve as claimed in claim 1 wherein the insert is configured to move reciprocally axially of the housing.

6. The valve as claimed in claim 5 wherein the insert is movable based upon hydraulic fluid pressure.

7. The valve as claimed in claim 6 wherein the fluid pressure is dedicated pressure from a control line.

8. The valve as claimed in claim 1 wherein the valve includes an annular seal disposed between the sleeve and the insert and an aperture seal disposed around at least one of the plurality of apertures.

9. A borehole system comprising:
a borehole in a subsurface formation;
a string disposed in the borehole; and
a valve as claimed in claim 1 disposed within or as a part of the string.

10. A rotary valve comprising:
a port housing, having a port;
an axially actuated rotary sleeve disposed within the port housing, the sleeve having an aperture, wherein the sleeve is movable within a pressure compensated clean fluid;
an insert disposed within the sleeve, the insert having a plurality of openings of distinct size from one another, the aperture of the sleeve being selectively alignable with one of the plurality of openings; and
wherein a balance piston is disposed between the insert and the port housing, the balance piston being exposed to annulus pressure on one side the clean fluid on a second side, during use.

11. The valve as claimed in claim 10 wherein the port housing includes a manifold groove.

12. The valve as claimed in claim 10 wherein the sleeve includes a J-slot.

13. The valve as claimed in claim 10 wherein the plurality of openings are 3 openings.

14. The valve as claimed in claim 10 wherein the valve includes an annular seal disposed between the sleeve and the insert and an aperture seal disposed around the aperture.

15. A borehole system comprising:
a borehole in a subsurface formation;
a string disposed in the borehole; and
a valve as claimed in claim 10 disposed within or as a part of the string.

16. A rotary valve comprising:
a hort housing, having a port;
an axially actuated rotary sleeve disposed within the port housing, the sleeve having an aperture; and
an insert disposed within the sleeve, the insert having a plurality of openings of distinct size from one another, the aperture of the sleeve being selectively alignable with one of the plurality of openings, wherein the insert is configured to move reciprocally axially of the housing.

* * * * *